(12) United States Patent
Shen

(10) Patent No.: US 6,225,755 B1
(45) Date of Patent: May 1, 2001

(54) HIGH POWER FACTOR ELECTRONIC BALLAST WITH SIMPLIFIED CIRCUIT TOPOLOGY

(75) Inventor: Eric B. Shen, Scarborough, NY (US)

(73) Assignee: Philips Electronics North America Corporation, New York, NY (US)

(*) Notice: Subject to any disclaimer, the term of this patent is extended or adjusted under 35 U.S.C. 154(b) by 0 days.

(21) Appl. No.: 09/431,582

(22) Filed: Nov. 1, 1999

(51) Int. Cl.$^7$ .................................................. H05B 41/16
(52) U.S. Cl. ...................... 315/247; 315/209 R; 315/291; 315/310; 315/DIG. 7
(58) Field of Search .............................. 315/209 R, 291, 315/307, 308, 219, 244, 247, 310, 311, DIG. 7

(56) References Cited

U.S. PATENT DOCUMENTS

| | | | |
|---|---|---|---|
| 4,370,600 | * | 1/1983 | Zansky ................................. 315/244 |
| 5,789,871 | * | 8/1998 | Shen et al. ........................... 315/291 |
| 5,917,290 | * | 6/1999 | Shen et al. ......................... 315/209 R |

* cited by examiner

Primary Examiner—Haissa Philogene
(74) Attorney, Agent, or Firm—Bernard Franzblau

(57) ABSTRACT

An electronic ballast circuit for driving a gas discharge lamp from a mains voltage signal supply includes a ballast bridge unit having upper and lower signal lines. A capacitive divider is disposed across the bridge. The capacitive divider comprises at least two capacitors coupled in series at a common reference voltage signal terminal. The bridge unit also includes two diodes coupled in series at a rectifier common terminal, wherein each of the diodes is respectively coupled to one of the signal lines of the bridge unit. The bridge unit further includes an input converter bridge and an output converter bridge each having at least two switches coupled in series at input and output common terminals, respectively.

26 Claims, 4 Drawing Sheets

HIGH POWER FACTOR ELECTRONIC BALLAST WITH SIMPLIFIED CIRCUIT TOPOLOGY

FIELD OF THE INVENTION

This invention relates to an electronic ballast system and more specifically to a ballast arrangement employed for driving High Intensity Discharge (HID) lamps with a signal having a controllable frequency.

BACKGROUND OF THE INVENTION

There is an ever increasing need for gas discharge lamps, such as fluorescent lamps, for both commercial and consumer applications. Gas discharge lamps are usually driven by a mains voltage supply source provided by power utility companies. In order to drive a discharge lamp from the mains voltage supply line, a ballast is employed that functions as an interface between the lamp and the supply line.

One main function of a ballast is to drive the discharge lamp with a signal that has an appropriate voltage and current level. Another important function of a ballast is to perform, what is known as, power factor correction. The voltage and current level necessary to operate the discharge lamp is governed, among other things, by the characteristics of the gas contained inside the lamp. Power factor correction is necessary to insure that the operation of the ballast does not contribute noise signals to the power supply line feeding the ballast. Typically, a power factor correction arrangement controls the supply current provided by the ballast such that it remains in phase with the voltage supply line waveform.

With the advent of HID lamps, the ballasts need to also ensure that the discharge lamp is driven by a low frequency current signal, in the range of 1 kHz or less. Driving an HID lamp at high frequencies is usually difficult due to arc instabilities caused by acoustic resonance. This resonance can lead to lamp failure.

FIG. 1 illustrates a circuit diagram of a typical ballast employed to drive an HID lamp. The operation of ballast 10 is very well understood and is not described in detail herein. The ballast circuit includes an upper signal line and a lower signal line each coupled to a respective terminal of mains power supply line. Ballast 10 comprises an EMI filter 36 followed by a full bridge diode rectifier 12 to rectify the ac voltage signal provided by the mains supply line. The rectified signal is then fed to a preconditioner stage, such as a boost converter 14, which operates to shape the ballast supply current, also referred to as mains current, for power factor correction. The preconditioner is followed by an energy storage capacitor 26, which accumulates a dc bus voltage $V_{bus}$, which is typically larger than the peak voltage level provided by the mains power supply line. Boost converter 14 includes an inductor 20 having inductance $I_L$, along the upper signal line of ballast 10, coupled in series with a diode 24, which in turn is coupled to storage capacitor 26. A transistor switch 22 is coupled across inductor 20 and the lower signal line of the ballast. The duty cycle of switch 22 can be controlled so as to operate the boost converter in different operation modes.

For example, boost converter 14 can operate under, what is known as, a continuous conduction mode operation (CCM). During this mode of operation, the average voltage across capacitor 26 is $$V_{26}=V_{in}/(1-D(t))$$

wherein $V_{in}$ is the voltage signal fed to boost converter 14 and D(t) a variable duty cycle of switch 22. A controller (not shown) varies the duty cycle of switch 22 so that the current $I_L$ has a sinusoidal shape that is in phase with the mains voltage supply waveform. Other control operation modes for boost converter 14 include discontinuous conduction mode operation (DCM) and critical discontinuous conduction mode operation (CDCM), which may be employed based on various design considerations. For a continuous conduction mode operation, the average voltage signal across inductor 20 is substantially zero.

Boost converter 14 is followed by a buck converter 16 that is fed by the dc bus voltage signal formed across capacitor 26. A transistor switch 28 couples capacitor 26 to an inductor 32, which in turn is coupled to a filter capacitor 34. A diode 30 is coupled to switch 28 and to the lower signal line of the ballast. The buck converter creates a dc current which drives the lamp through a commutator stage 18.

Commutator stage 18 includes four transistor switches, which interchangeably operate to switch the current signal provided to lamp 36. The commutator inverts the lamp polarity at a low frequency, typically in the 100 Hz range.

One disadvantage with the ballast circuit described in FIG. 1 is that it suffers from a high component count and poor converter efficiency. There has been some effort to reduce the number of component parts of a ballast for driving HID lamps. One approach is to synchronize the lamp current to the power supply voltage frequency, as described in U.S. Pat. No. 5,917,290, entitled Parallel-Storage Series-Drive Electronic Ballast. The disadvantage of such a ballast circuit is that when the frequency of the power voltage supply signal is low, for example 50 Hz, there is the possibility of a visible light flicker from the lamp.

Thus, there is a need for an efficient and simple ballast circuit having a low component count and a driving current signal that has a controllable frequency to avoid possible light flicker.

SUMMARY OF THE INVENTION

In accordance with one embodiment of the invention an electronic ballast circuit includes a ballast bridge unit configured to receive a ballast supply signal from a mains voltage supply line via an input inductor. The ballast bridge unit comprises an input converter bridge having at least two transistor switches coupled in series at a common terminal, wherein an upper transistor switch is coupled to the upper signal line of the ballast bridge unit and the lower transistor switch is coupled to the lower signal line of the ballast bridge unit. The transistor switches of the input converter bridge are operated such that the input converter current waveform follows the mains voltage supply signal waveform.

The ballast bridge unit includes a rectifier bridge comprising two diodes coupled in series forming a diode bridge common terminal. The upper diode is coupled to the upper signal line of the bridge unit, while the lower diode is coupled to the lower signal line of the bridge unit.

The ballast bridge unit further comprises an output converter bridge having at least two transistor switches coupled in series at an output common terminal, wherein an upper transistor switch is coupled to the upper signal line of the ballast bridge unit and the lower transistor switch is coupled to the lower signal line of the ballast bridge unit. The transistor switches of the output converter bridge are operated such that the average voltage signal level of their common output terminal shifts between two desired values, so as to form an ac current for driving a gas discharge lamp.

The ballast bridge unit also comprises a capacitor divider bridge having at least two storage capacitors coupled in series at a reference voltage common terminal, wherein an upper storage capacitor is coupled to the upper line of the ballast bridge unit and the lower storage capacitor is coupled to the lower signal line of the ballast bridge unit. The voltage across the two storage capacitors defines a bus voltage signal, $V_{bus}$, for the input and output converters of the ballast circuit. The average voltage signal level of the reference voltage terminal is set at half the bus voltage signal so as to form a differential voltage signal between the output common terminal and the common reference voltage terminal.

The output common terminal of the ballast bridge unit is coupled to a filter capacitor via an output inductor so as to provide a driving signal to a gas discharge lamp disposed across the filter capacitor.

During operation, the input converter bridge switches are controlled at a high frequency in a pulse width modulation arrangement to shape the input inductor current to be in phase with the mains voltage signal. The diodes in the rectifier bridge work together with input converter bridge switches to rectify the mains voltage signal.

The switches of the output converter bridge successively operate in an active arrangement for a desired period of time so as to provide an ac current signal to a gas discharge lamp that is driven by the electronic ballast circuit. Advantageously, the frequency within which the active operation of the switches successively changes defines the frequency of the current signal that drives the gas discharge lamp.

The arrangement of the ballast circuit in accordance with the principles of the present invention provides for a simple design with a low component part count and high efficiency that generates a lamp driving current that has a desirable frequency above a range that causes visible light to flicker.

In accordance with another embodiment of the invention, the ballast bridge unit also includes a low frequency voltage reference bridge having a reference voltage terminal that provides a shifting voltage differential between the output common terminal of output converter bridge and the reference voltage terminal.

DETAILED DESCRIPTION OF THE DRAWINGS

Figure 2:
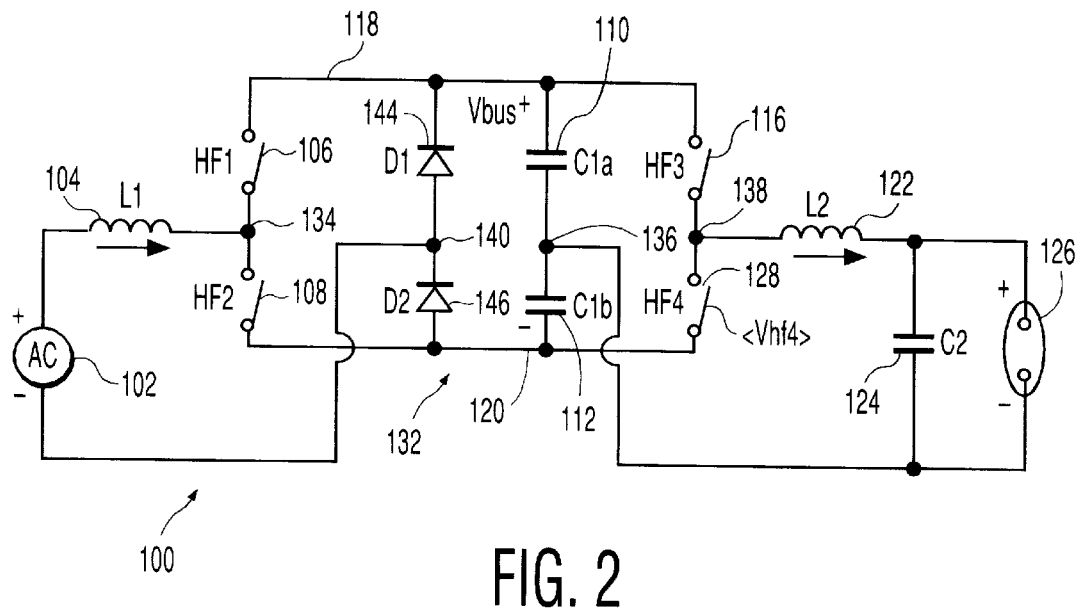
FIG. 2 illustrates a circuit diagram of a ballast circuit in accordance with one embodiment of the invention.

FIG. 2 illustrates an electronic ballast circuit 100 in accordance with one embodiment of the present invention. Voltage supply source 102 represents the mains ac power supply voltage signal. Voltage supply source 102 is coupled to an input inductor 104 having an inductance $L_1$. Input inductor 104 is coupled to a ballast bridge unit 132.

Ballast bridge unit 132 includes an input converter bridge that contains two high frequency switches 106 and 108 coupled in series. The input common terminal 134 of the input converter bridge is coupled to inductor 104. Upper switch 106 is coupled to the upper signal line 118 of the ballast bridge unit, whereas the lower switch 108 is coupled to the lower signal line 120 of the ballast bridge unit.

Ballast bridge unit 132 also includes a capacitor bridge that comprises a capacitive divider made of two capacitors 110 and 112 coupled in series at a common reference voltage terminal 136. The other terminal of capacitor 110 is coupled to upper signal line 118 of ballast bridge unit 132. The other terminal of capacitor 112 is coupled to lower signal line 120 of the ballast bridge unit 132. The voltage across the two capacitors 110 and 112 defines a bus voltage, $V_{bus}$, employed by the input and output converters of ballast circuit 100 in accordance with one embodiment of the present invention.

Ballast bridge unit 132 further includes an output converter bridge that contains two high frequency switches 116 and 128 coupled in series. The output common terminal 138 of the output converter bridge is coupled to an output inductor 122. Upper switch 116 is coupled the upper signal line 118 of the ballast bridge unit, whereas the lower switch 128 is coupled to the lower signal line 120 of the ballast bridge unit.

Finally, ballast bridge unit 132 includes a rectifier bridge that contains two diodes 144 and 146 coupled in series. The bridge common terminal 140 is coupled to one terminal of mains voltage signal source 102. The cathode terminal of diode 144 is coupled to the upper signal line of ballast bridge unit 132, while the anode terminal of diode 146 is coupled to the lower signal line of the ballast bridge unit.

Ballast circuit 100 further includes a filter capacitor 124 and a lamp 126 coupled in parallel, configured to be driven by the current provided through output inductor 122, which has an inductance $L_2$. One terminal of lamp 126 is coupled to inductor 122, while its other terminal is coupled to common reference voltage terminal 136.

It is noted that the input stage of ballast circuit 100 includes the two switches 106 and 108 and inductor 104, which together form an input converter for regulating the input supply current. The input converter functions similarly to a boost converter. Diodes 144 and 146 are typically low frequency diodes which work together with switches 106 and 108 to rectify the voltage signal provided by mains voltage signal source 102. The output stage of ballast circuit 100 includes the two high frequency switches 116 and 128 and inductor 122 which form an output converter employed to regulate the output current that drives gas discharge lamp 126. The output converter functions similarly to a buck converter. As explained above, capacitors 110 and 112 together form a voltage storage capacitor for storing the voltage signal $V_{bus}$ as employed by the input converter input stage and the output converter output stage.

During operation, high frequency switches 106 and 108 are operated at a high frequency, for example, 100 kHz, with inductor 104 to regulate the current signal flowing through input inductor 104. When the mains voltage signal generated by voltage signal source 102 has a positive level, and current signal $I_{L1}$ flowing through inductor 104 is also positive, diode 146 is forward biased. In this case, switch 108 which is activated, performs the function of the input converter transistor, and switch 106, which is deactivated, performs the function of the input converter diode. Alternatively, when the mains voltage signal generated by voltage signal source 102 has a negative level, the current signal $I_{L1}$ flowing through inductor 104 is negative and diode 144 is forward biased. In this case switch 106, which is activated, performs the function of the input converter transistor, and switch 108, which is deactivated, performs the function of the input converter diode.

In accordance with one embodiment of the invention, the input converter is operated under the continuous conduction mode (CCM) described above. For this operation, diodes 144 and 146 may be low frequency diodes. This follows because the diodes are alternatively forward biased at a frequency substantially equal to the frequency of the mains voltage signal.

On the load side of ballast circuit 100, switches 116 and 128 are operated at a high frequency pulse width modulated arrangement to shape the current signal flowing through inductor 122 as a low frequency square wave. It is noted that the frequency of the driving current signal may be a specifiable frequency depending on the operation of switches 116 and 128 as described hereinafter.

In accordance with one embodiment of the present invention, both the input converter and the output converter of ballast circuit 100 operate under continuous conduction mode (CCM) operation. Thus, if the duty cycle of switch 116 is D1 then the average voltage signal at common output terminal 138 labeled <vhf4> is $$D1 \times V_{bus}.$$

For example, if the voltage signal, $V_{bus}$, across capacitors 110 and 112 is 300 Volts and the voltage signal at the reference voltage terminal 136 is 150 Volts, to generate a lamp voltage of 100 Volts, the duty cycle of switch 116 is chosen so that the average voltage across switch 128 is 250 Volts. This follows because the difference between the average voltage signal across switch 128 and the reference voltage terminal of capacitive bridge is substantially equal to the lamp voltage. The average voltage potential across inductor 122 is substantially zero for continuous conduction mode (CCM) operation. Similarly, in order to generate a lamp voltage of −100 Volts, the duty cycle of switch 116 is chosen such that the average voltage across switch 128 is 50 Volts. While continuous conduction mode (CCM) operation has been described for purposes of illustration, the invention embodied in ballast circuit 100 is not limited in scope in that respect. For example, the ballast circuit may be operated in the discontinuous conduction mode or critical discontinuous conduction mode.

The lamp polarity may be shifted, or inverted, at any frequency, independent of the frequency of the mains voltage supply signal. All that is necessary is to activate switch 116 for a specifiable period of time, while switch 128 is deactivated, and conversely, activate switch 128 for a specifiable period of time, while switch 116 is deactivated.

It is noted that in order for the ballast circuit arrangement of FIG. 2 to operate properly so as to generate the required voltage signals, the bus voltage signal, $V_{bus}$, must be greater than either the peak level of the mains voltage signal or twice the lamp voltage signal, whichever is greater.

Figure 1:
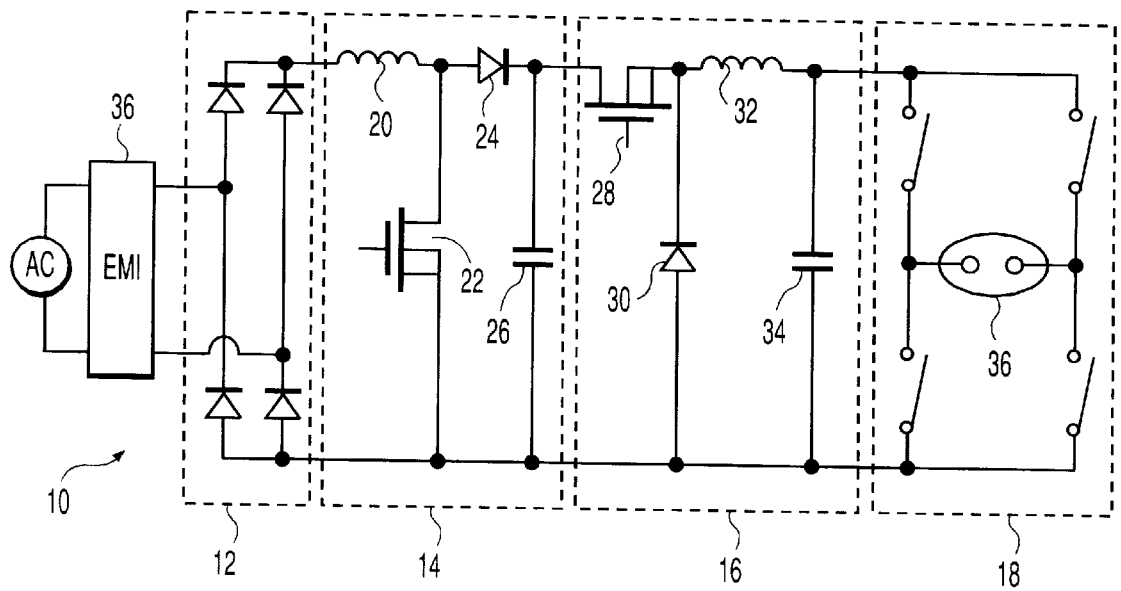
FIG. 1 illustrates a circuit diagram of a prior art ballast circuit for driving a high intensity discharge lamp.

Thus, in accordance with the principles of the present invention, ballast circuit 100 achieves desired driving voltage and current signals with a specifiable frequency and with a substantially lower component count than the prior art ballast circuit illustrated in FIG. 1. Furthermore, the combined voltage rating for the storage capacitors 110 and 112 is on the order of either the peak level of the mains voltage or about twice the lamp voltage.

With the capacitive divider bridge illustrated in FIG. 2, the available voltage signal to lamp 126 is half of bus voltage signal, $V_{bus}$. However, there may be applications where the required voltage signal for lamp 126 is substantially higher. In that event, the voltage rating of capacitors 110 and 112 will be correspondingly higher.

Figure 3:
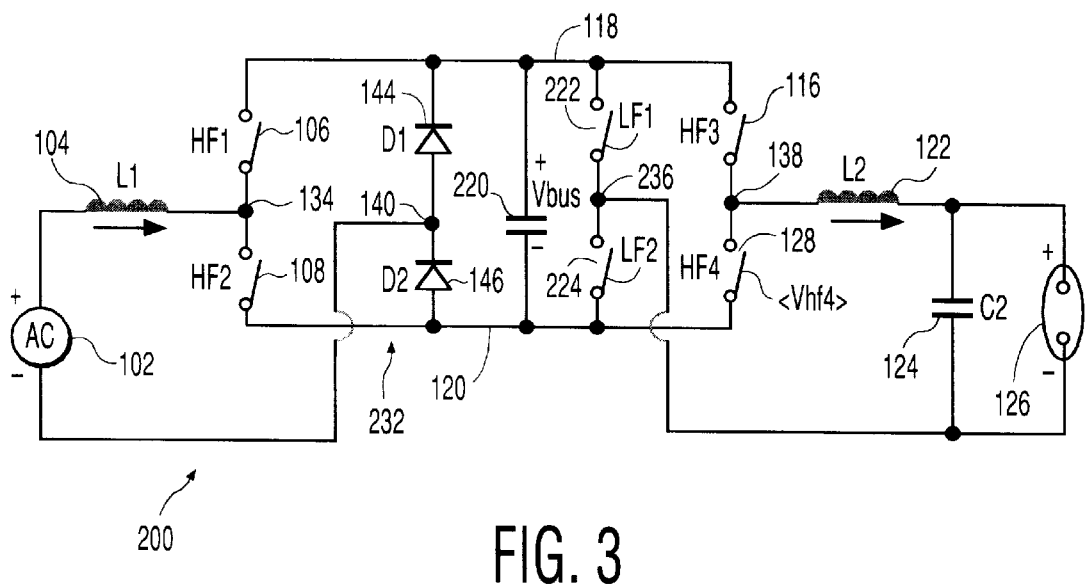
FIG. 3 illustrates a circuit diagram of a ballast circuit in accordance with another embodiment of the invention.

FIG. 3 illustrates a ballast circuit 200 in accordance with another embodiment of the invention, which increases the available voltage to lamp 126 as compared to ballast circuit 100 (FIG. 2). Specifically, in ballast circuit 200 the capacitive divider of the ballast bridge unit is replaced by a low frequency reference voltage bridge that contains two low frequency switches 222 and 224 coupled in series and having a reference common terminal 236. Upper switch 222 is coupled to upper signal line 118 of bridge unit 232, while the lower switch 224 is coupled to the lower signal line 120 of bridge unit 232. Furthermore, a storage capacitor 220 is coupled across bridge unit 232, having one terminal coupled to the upper signal line of the bridge unit and the other terminal coupled to the lower signal line of the bridge unit, so as to accumulate a bus voltage signal, $V_{bus}$.

During operation, when switch 224 is activated, switch 116 is activated to perform the function of an output transistor switch, while switch 128 is deactivated to perform the function of an output converter diode. As a result, positive current and voltage signals are delivered to lamp 126. Similarly, when switch 222 is activated, switch 128 is activated to perform the function of an output transistor switch, while switch 116 is deactivated to perform the function of an output converter diode. As a result, negative current and voltage signals are delivered to lamp 126. Therefore, the available voltage to be delivered to the lamp 126 is on the order of the bus voltage $V_{bus}$ in both positive and negative polarities. The rate with which transistor switches 222 and 224 are alternatively activated and deactivated defines the frequency of voltage and current signals that drive lamp 126.

Figure 4A:
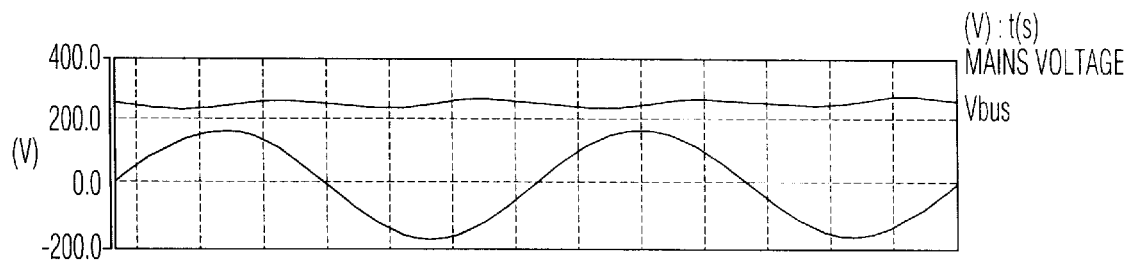
FIGS. 4(a)–4(d) are plots of waveforms representing signals generated by the ballast circuit illustrated in FIG. 2 providing a 120 Hz output frequency.

FIGS. 4a–4d illustrate the waveforms generated in connection with the operation of an electronic ballast circuit, such as the one illustrated in FIG. 2. Specifically, FIG. 4a illustrates voltage signal $V_{bus}$ which is set to about 400 Volts, and the voltage signal provided by mains power supply line. As illustrated, the mains voltage signal swings between positive and negative 170 Volts. The output frequency of the signal driving lamp 126 is configured to be 120 Hz.

Figure 4B:
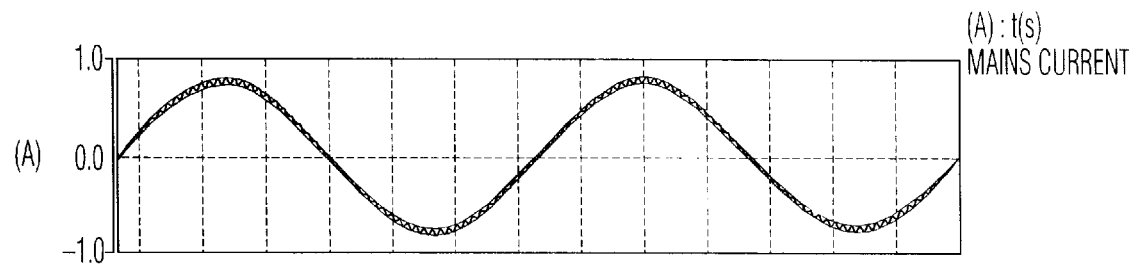

FIG. 4(b) illustrates the current signal flowing through input inductor 104, which is in phase with the mains voltage signal (FIG. 4a).

Figure 4C:
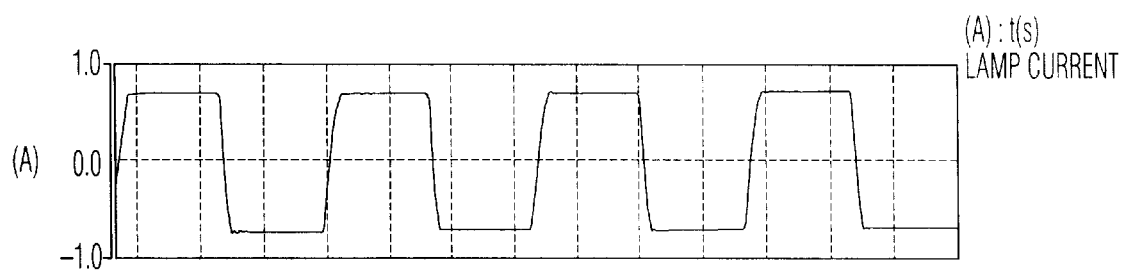
Figure 4D:
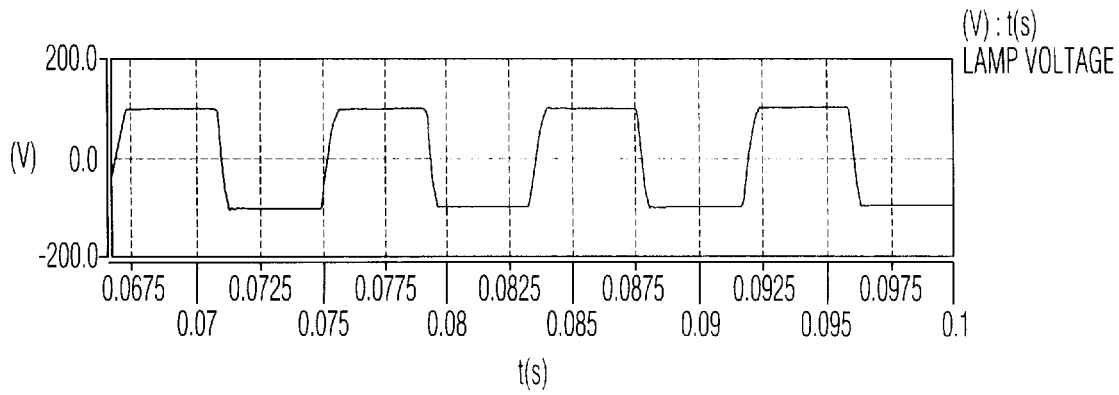
Figure 5A:
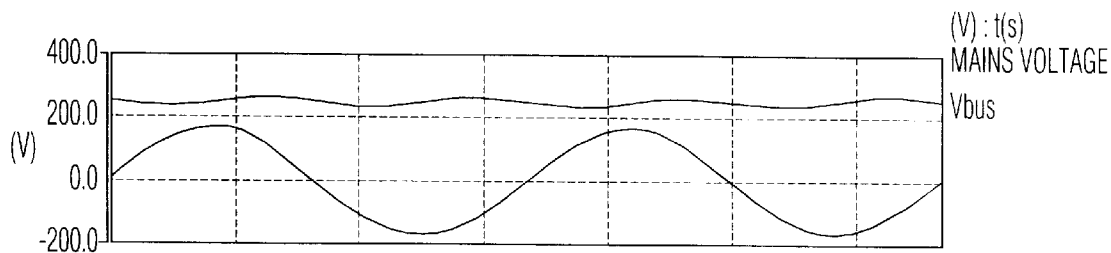
FIGS. 5(a)–5(d) are plots of waveforms representing signals generated by the ballast circuit illustrated in FIG. 2 providing a 200 Hz output frequency.
Figure 5B:
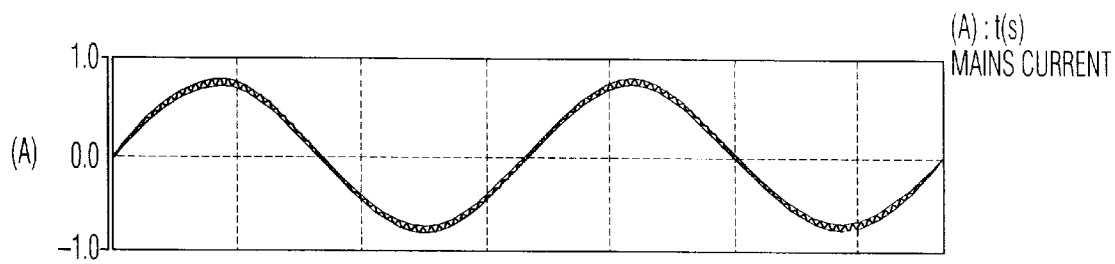
Figure 5C:
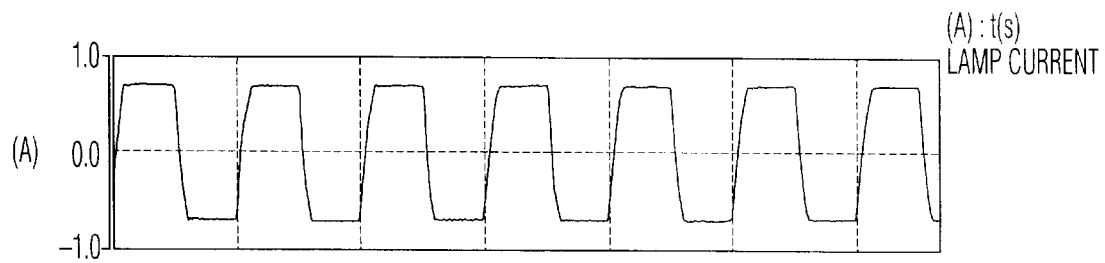
Figure 5D:
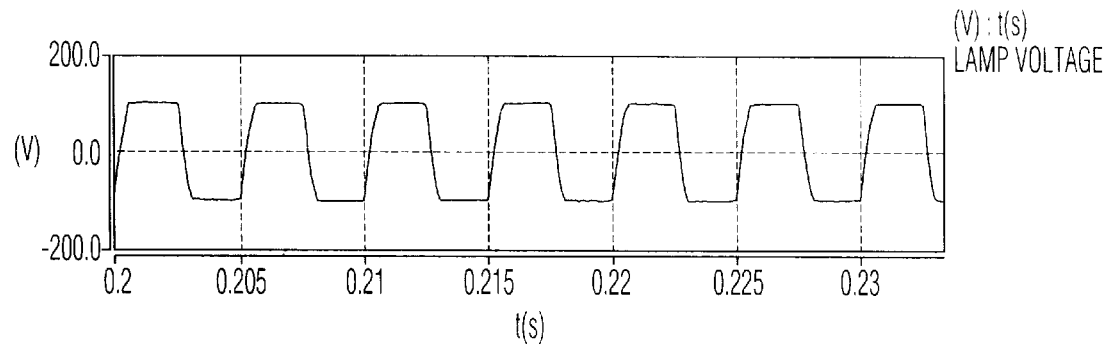

FIG. 4(c) illustrates the lamp current signal flowing through inductor 122, while FIG. 4(d) illustrates the lamp voltage signal across capacitor 124.

FIGS. 5(a)–5(d) illustrate the waveforms generated in connection with the operation of the electronic ballast circuit, such as the one illustrated in FIG. 2, wherein the frequency of the driving signal is configured to be 200 Hz.

While only certain features of the invention have been illustrated and described herein, many modifications, substitutions, changes or equivalents will now occur to those skilled in the art. It is therefore to be understood that the appended claims are intended to cover all such modifications and changes that fall within the true spirit of the invention.

What is claimed is:

1. In an electronic ballast circuit for driving a gas discharge lamp from a mains voltage signal supply, a ballast bridge unit having an upper and lower signal line comprises:

a capacitive bridge having at least two capacitors coupled in series at a common reference voltage signal terminal, wherein one of said capacitors is coupled to the upper signal line of the bridge unit and another one of said capacitors is coupled to the lower signal line of said bridge unit;

a bridge having at least two diodes coupled in series at a rectifier bridge common terminal, wherein one of said diodes is coupled to the upper signal line of the bridge unit and another one of said diodes is coupled to the lower signal line of said bridge unit;

an input converter bridge having at least two switches coupled in series at an input common terminal, wherein an upper switch of said input converter bridge is coupled to the upper signal line of the ballast bridge unit and the lower switch of said input converter bridge is coupled to the lower signal line of the ballast bridge unit; and an output converter bridge having at least two switches coupled in series at an output common terminal, wherein an upper switch of said output converter bridge is coupled to the upper signal line of the ballast bridge unit and the lower switch is coupled to the lower signal line of the ballast bridge unit.

2. The ballast bridge unit in accordance with claim 1 wherein said transistors.

3. The ballast bridge unit in accordance with claim 2, wherein sain common terminal of said input converter bridge is coupled to an input inductor, said common terminal of said output converter bridge is coupled to an output inductor said rectifer bridge common terminal is coupled to one terminal of a mains voltage signal supply line, and said common reference voltage signal terminal is coupled to one terminal of said gas discharge voltage.

4. The ballast bridge unit in accordance with claim 2, wherein said switch of said output converter bridge coupled to the upper signal line of said bridge unit is activated and deactivated at a frequency defining frequency of a current signal driving the gas discharge lamp.

5. The ballast bridge unit in accordance with claim 4, wherein said switch of said output converter bridge coupled to the lower signal line of said bridge unit is deactivated while the corresponding switch coupled to the upper signal line of said bridge unit is activated and vice versa.

6. The ballast bridge unit in accordance with claim 2 wherein the voltage signal level across said capacitive bridge is substantially equal to the greater of the peak mains voltage supply and the peak to peak lamp voltage swing.

7. The ballast bridge unit in accordance with claim 1, wherein said common terminal of said input converter bridge is coupled to an input inductor, said common terminal of said output converter bridge is coupled to an output inductor, said rectifier bridge common terminal is coupled to one terminal of a mains voltage signal supply line, and said common reference voltage signal terminal is coupled to one terminal of said gas discharge lamp.

8. The ballast bridge unit as claimed in claim 1 wherein the switches of the input converter bridge operate independently of the switches of the output converter bridge.

9. The ballast bridge unit as claimed in claim 1 wherein the switches of the input converter bridge are operated so as to shape the input converter current waveform to be relatively in phase with the mains voltage and the switches of the output converter bridge are operated such that the average voltage level at their output common terminal shifts between two voltage levels in a manner so as to form an AC current for driving a gas discharge lamp when connected to the output common terminal of the output converter bridge.

10. In an electronic ballast circuit for driving a gas discharge lamp from a mains voltage signal supply, a ballast bridge unit having an upper and lower signal line comprises:

a storage capacitor coupled across said upper and lower bridge unit signal lines;

an input converter bridge having at least two switches coupled in series at an input common terminal, wherein an upper switch of said input converter bridge is coupled to the upper signal line of the ballast bridge unit and the lower switch of said input converter bridge is coupled to the lower signal line of the ballast bridge unit;

an output converter bridge having at least two switches coupled in series at an output common terminal, wherein an upper switch of said output converter bridge is coupled to the upper signal line of the ballast bridge unit and the lower switch is coupled to the lower signal line of the ballast bridge unit;

a low frequency reference voltage bridge having at least two switches coupled in series at a common reference voltage terminal, wherein an upper switch of said reference voltage bridge is coupled to the upper signal line of the ballast bridge unit and the lower switch of said reference voltage bridge is coupled to the lower signal line of the ballast bridge unit; and a rectifier bridge having at least two diodes coupled at a common rectifier bridge terminal, wherein an upper diode of said rectifier bridge is coupled to the upper signal line of the ballast bridge unit and the lower diode of said rectifier bridge is coupled to the lower signal line of the ballast bridge unit.

11. The ballast bridge unit in accordance with claim 10 wherein said switches of said input and output converter bridges are high frequency switching transistors.

12. The ballast bridge unit in accordance with claim 11, wherein said common terminal of said input converter bridge is coupled to an input inductor, said common terminal of said output converter bridge is coupled to an output inductor, said common terminal of said reference voltage bridge is coupled to one terminal of said gas discharge lamp, and said common terminal of rectifier bridge is coupled to one terminal of the a mains power supply line.

13. The ballast bridge unit in accordance with claim 11, wherein said switch of said output converter bridge coupled to the upper signal line of said bridge unit and said switch of said low frequency reference voltage bridge coupled to the lower signal line of said bridge unit are activated and deactivated at a frequency defining the frequency of a current signal driving the gas discharge lamp.

14. The ballast bridge unit in accordance with claim 13, wherein said switch of said output converter bridge coupled to the lower signal line of said bridge unit and said switch of said low frequency reference voltage bridge coupled to the upper signal line of said bridge unit are deactivated while the corresponding switches of each of said bridges are activated, and vice versa.

15. The ballast bridge unit in accordance with claim 10, wherein the voltage signal level across said storage capacitor is substantially equal to the greater of the peak mains voltage supply swing and the peak to peak lamp voltage swing.

16. In a ballast circuit for driving a gas discharge lamp from a mains voltage supply line, said ballast circuit having a ballast bridge unit having an input converter bridge coupled in parallel with an output converter bridge, a reference voltage signal bridge, and a rectifier bridge, a method for operating said ballast circuit comprising the steps of:

forming a voltage bus signal $V_{bus}$ across a capacitive divider of said reference voltage signal bridge; and shifting an average voltage signal at a common output terminal between two desired levels so as to form an ac current for driving the gas discharge lamp.

17. The method in accordance with claim 13 wherein said common output terminal comprises a common output terminal of said output converter bridge, the method further comprising the step of actively switching transistor switches of said output converter bridge so as to form desired voltage signals at said common output terminal of said output converter bridge.

18. The method in accordance with claim 17 wherein said actively switching step further comprises the step of actively switching a transistor switch coupled to an upper signal line of said bridge unit, while deactivating a transistor switches coupled to a lower signal line of said bridge unit.

19. The method in accordance with claim 18 further comprising the step of shifting the active operation of said output converter bridge switches so as to define a frequency of a current signal driving the lamp.

20. An electronic ballast circuit for a discharge lamp comprising:

first and second circuit input terminals for connection to a source of AC supply voltage for the ballast circuit and discharge lamp, a ballast bridge unit having an upper and lower supply line which comprises;

a capacitive bridge having at least first and second capacitors coupled in series to said upper and lower supply lines and with a common reference voltage terminal, a rectifier bridge having at least first and second diodes coupled in series to said upper and lower supply lines and with a rectifier bridge common terminal, an input converter bridge having at least first and second switches coupled in series to said upper and lower supply lines and with an input common terminal, an output converter bridge having at least first and second switches coupled in series to said upper and lower supply lines and with an output common terminal, said ballast circuit further comprising;

first and second output terminals for connection to the discharge lamp, and means coupling said input common terminal and said rectifier bridge common terminal to said first and second circuit input terminals, respectively.

21. The electronic ballast circuit as claimed in claim 20 further comprising:

second means coupling said output common terminal and said common reference voltage terminal to said first and second output terminals, respectively.

22. The electronic ballast circuit as claimed in claim 21 wherein the first coupling means includes a first inductor connected between the input common terminal and the first circuit input terminal, and the second coupling means includes a second inductor connected between the output common terminal and the first output terminal.

23. The electronic ballast circuit as claimed in claim 22 further comprising a third capacitor coupled between said first and second output terminals.

24. The electronic ballast circuit as claimed in claim 20 wherein the first and second capacitors are charged via circuit means including the first and second switches of the input converter bridge and the first and second diodes of the rectifier bridge and exclusive of said first and second output terminals.

25. The electronic ballast circuit as claimed in claim 20 wherein the first and second capacitors are combined into a single capacitor, and said ballast bridge unit further comprises a low frequency bridge having first and second switches coupled in series to said upper and lower supply lines and with a common terminal coupled to the second output terminal.

26. The electronic ballast circuit as claimed in claim 20 wherein said first and second switches of the input converter bridge operate independently of the first and second switches of the output converter bridge.

* * * * *